C. C. NUCKOLS.
THERMOSTATIC SWITCH.
APPLICATION FILED OCT. 25, 1913.

1,191,336.

Patented July 18, 1916.
2 SHEETS—SHEET 1.

WITNESSES:
L. S. S. Crisman
J. B. Graham

INVENTOR
Claude C. Nuckols
BY E. M. Bentley
ATTY.

C. C. NUCKOLS.
THERMOSTATIC SWITCH.
APPLICATION FILED OCT. 25, 1913.
1,191,336.
Patented July 18, 1916.
2 SHEETS—SHEET 2.
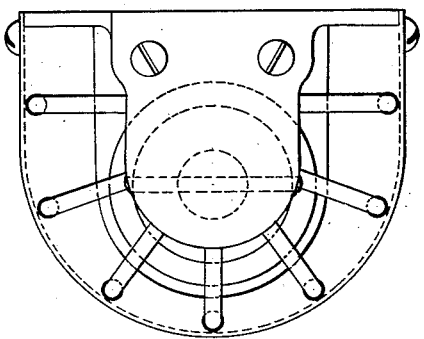
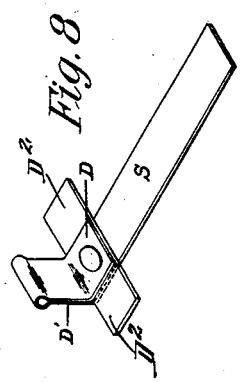
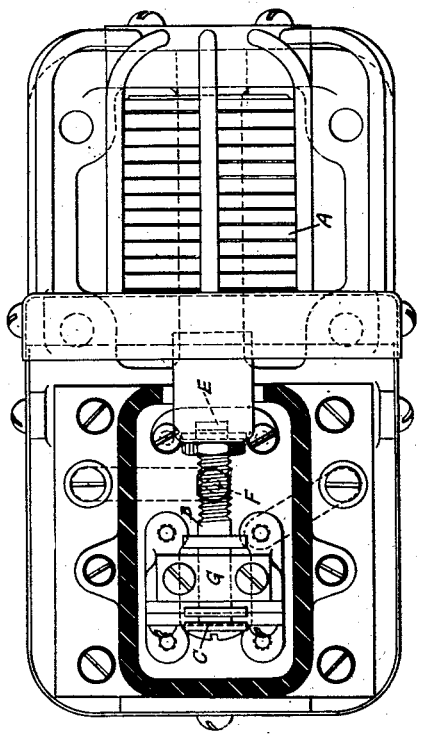
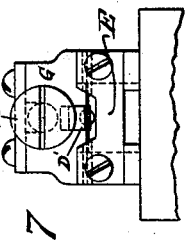
WITNESSES:
L. S. S. Crisman
J. B. Graham
INVENTOR
Claude C. Nuckols
BY E. M. Bentley
ATTY.

UNITED STATES PATENT OFFICE.

CLAUDE C. NUCKOLS, OF ALBANY, NEW YORK, ASSIGNOR TO CONSOLIDATED CAR-HEATING COMPANY, OF ALBANY, NEW YORK, A CORPORATION OF WEST VIRGINIA.

THERMOSTATIC SWITCH.

1,191,336.     Specification of Letters Patent.     Patented July 18, 1916.

Application filed October 25, 1913. Serial No. 797,238.

*To all whom it may concern:*

Be it known that I, CLAUDE C. NUCKOLS, a citizen of the United States, residing at Albany, county of Albany, and State of New York, have invented certain new and useful Improvements in Thermostatic Switches, the following being a full, clear, and exact disclosure of the one form of my invention which I at present deem preferable.

For a detailed description of the present form of my invention, reference may be had to the following specification and to the accompanying drawings, forming a part thereof, wherein—

Figure 1:
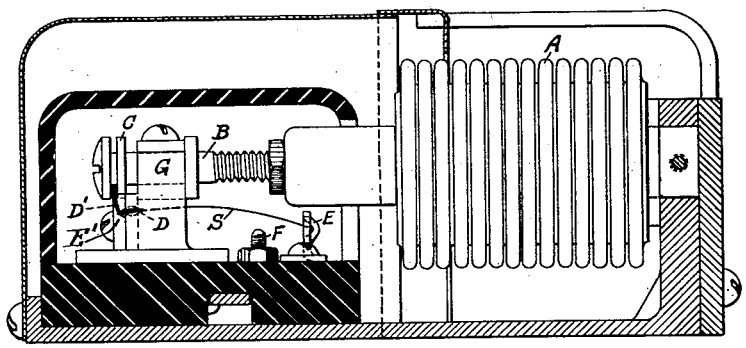
Figure 2:
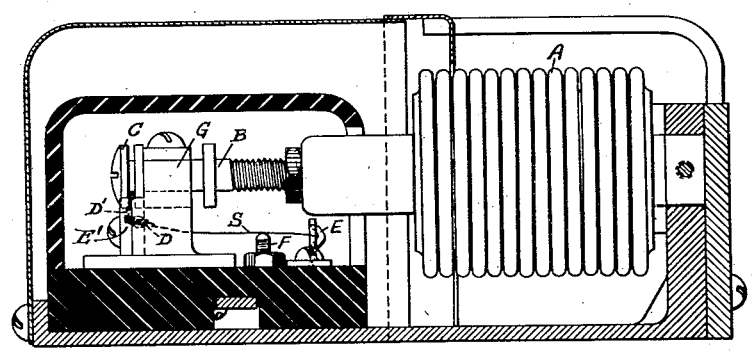
Figure 3:
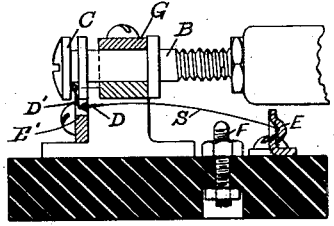
Figure 4:
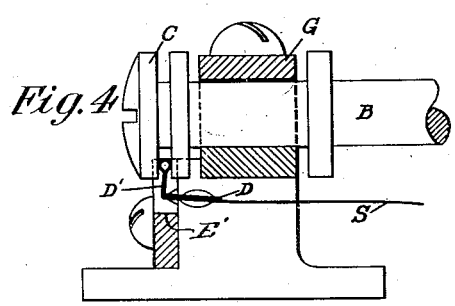

Figures 1 and 2 are sections, showing respectively the open and closed positions of the switch, Figs. 3 and 4 representing details.

In my construction I employ a thermostatic element consisting of a corrugated metallic tube closed at both ends and filled with a liquid having a low boiling point. The corrugated tube forms a sort of bellows and being sealed under a vacuum the atmospheric pressure will compress the bellows when the liquid contained therein is condensed. When the temperature reaches the boiling point of the liquid it is converted into a vapor which expands against the atmospheric pressure and thereby serves to operate the switch element which, in my construction, consists simply of a longitudinally confined spring normally bowed on one side or the other of its dead center and adapted to be thrown across its dead center by means of a suitable connection with the bellows aforesaid.

In the drawing the corrugated metal tube is represented at A and is rigidly supported at the right-hand end on the base or standard of the apparatus. Its left-hand end is free to come and go under the expansion and contraction and is provided with an adjustable stem B adapted to slide freely through an opening in the post G. On the stem B is secured a disk C having a groove in its periphery which is engaged by the arm $D^1$ of an angle lever, the other arm thereof, D, being secured to one end of a spring S. Attached to the arm $D^1$ and to the contiguous ends of the spring S are lateral arms $D^2$ which engage spaced apart notches in a standard $E^1$. The other end of spring S enters a V-shaped notch in the standard E. The spring S is therefore confined longitudinally between the standards E and $E^1$ and is somewhat longer than the direct distance between the confining members, so as to cause it to assume a bowed form either above the dead center line, as shown in Fig. 1 of the drawing, or below that line when the spring is turned so as to snap suddenly from the position shown in the drawing to a corresponding position below the dead center. It will be manifest that as the stem B is moved to the right when the bellows contracts, the disk C will turn the angle lever D, $D^1$ on its pivot until the arm D passes the dead center position, whereupon the spring will suddenly snap across from its upper to its lower position. In its latter position it will come into contact with an insulated electric contact F and thereby close the electric circuit. On the other hand, when the stem B moves to the left as the bellows expands the reverse operation will take place and the electric circuit will be broken. It will be manifest that the contact F may be placed above instead of below the spring S so as to close the circuit on the upward instead of the downward movement of the spring and also that two springs S may be employed, one closing the circuit on the upward and the other on the downward movement of the spring. The groove in the periphery of the disk will be wide enough to allow such slight degree of lost motion between the arm $D^1$ and the disk as may be necessary to allow the full throw of the spring into either one of its two positions. It will be observed that the initial flexing of the spring S, which may take place more or less gradually, will occur near the angle-lever D, $D^1$ and will not affect that portion of the spring which is in contact with the stationary contact point F, the said contact being located at one side of the center of the bow. The electrical connection will be maintained until the flexing has progressed far enough to cause the spring to snap over its dead center, thereby breaking its contact with point F suddenly and positively.

What I claim as new and desire to secure by Letters Patent is:

1. A thermostatic switch comprising spaced apart abutments, a contact spring having its ends engaging said abutments, the spring being of a greater length than the direct distance between said abutments, whereby the spring is normally bowed under longitudinal compression, a stationary contact coöperating with said spring contact, and means engaging and moving one end of said spring to vary the longitudinal compression thereof to throw it across its dead center.

2. A thermostatic switch comprising a thermostatic element, a longitudinally confined spring pivoted at one end and normally bowed between its confining members, an electric contact controlled by said spring and an operating connection between said element and the spring for rotating the pivoted end of the spring across its dead center.

3. A thermostatic switch comprising spaced apart abutments, a contact spring having its ends engaging said abutments, the spring being of a greater length than the direct distance between said abutments, whereby the spring is normally bowed under longitudinal compression, a stationary contact coöperating with said spring contact, a thermostatically operated member movable longitudinally with respect to the contact spring, and a lost motion connection between one end of the said contact spring and the said thermostatic member, for varying the longitudinal compression of the contact spring to throw it across its dead center.

4. A thermostatic switch comprising spaced apart abutments, a contact spring having its ends engaging said abutments, the spring being of a greater length than the direct distance between said abutments, whereby the spring is normally bowed under longitudinal compression, a stationary contact coöperating with said spring contact, an angle lever attached to one end of said contact spring, and means engaging said angle lever and movable longitudinally with respect to the contact spring to vary the longitudinal compression thereof to throw it across its dead center.

5. A thermostatic switch comprising spaced apart abutments, a contact spring having its ends engaging said abutments, the spring being of a greater length than the direct distance between said abutments, whereby the spring is normally bowed under longitudinal compression, a stationary contact coöperating with said contact spring, and a thermostatic element consisting of an expansible corrugated metal tube containing a vaporizable liquid and having means for engaging and moving one end of said contact spring to vary the longitudinal compression thereof, whereby it may be thrown across its dead center.

6. A thermostatic switch comprising a thermostatic element consisting of an expansible corrugated metal tube containing a vaporizable liquid, an angle lever operated by the expansion and contraction of said tube, a contact spring connected at one end to one arm of said lever, confining members for the ends of said contact spring, and an electric contact positioned to be engaged by said contact spring when moved across its dead center.

7. A thermostatic switch, comprising a thermostatic element, a longitudinally confined contact spring, normally bowed between its confining members, an electric contact located at one side of the center of the bow, and an operating connection movable longitudinally with respect to said spring contact for throwing the same across its dead center.

In witness whereof I have hereunto set my hand, before two subscribing witnesses, this 9th day of October, 1913.

CLAUDE C. NUCKOLS.

Witnesses:
JAMES F. MCELROY,
HERBERT A. CAULKINS.